United States Patent
Wang

(10) Patent No.: US 12,450,186 B2
(45) Date of Patent: Oct. 21, 2025

(54) AUTOMATIC CONSTRUCTION METHOD AND APPARATUS FOR AUTOMOBILE BUS TOPOLOGY MAP, AND COMPUTING DEVICE

(71) Applicant: Autel Intelligent Technology Corp., Ltd., Shenzhen (CN)

(72) Inventor: Weilin Wang, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 180 days.

(21) Appl. No.: 18/270,866

(22) PCT Filed: Dec. 13, 2021

(86) PCT No.: PCT/CN2021/137481
§ 371 (c)(1),
(2) Date: Jul. 5, 2023

(87) PCT Pub. No.: WO2022/148213
PCT Pub. Date: Jul. 14, 2022

(65) Prior Publication Data
US 2024/0054091 A1 Feb. 15, 2024

(30) Foreign Application Priority Data
Jan. 6, 2021 (CN) .......................... 202110013942.3

(51) Int. Cl.
G06F 13/40 (2006.01)
G07C 5/08 (2006.01)

(52) U.S. Cl.
CPC ....... *G06F 13/4068* (2013.01); *G07C 5/0808* (2013.01)

(58) Field of Classification Search
CPC ....................................................... G06F 30/18
See application file for complete search history.

(56) References Cited

U.S. PATENT DOCUMENTS

2013/0226393 A1   8/2013 Julson
2015/0113328 A1*  4/2015 Jiang .................. H04L 41/0677
                                                  714/37

(Continued)

FOREIGN PATENT DOCUMENTS

CN    101598758 A    12/2009
CN    106503376 A     3/2017

(Continued)

OTHER PUBLICATIONS

International Search Report of PCT Patent Application No. PCT/CN2021/137481 issued on Mar. 10, 2022.

(Continued)

*Primary Examiner* — Rehana Perveen
(74) *Attorney, Agent, or Firm* — Andrew C. Cheng

(57) ABSTRACT

Embodiments of the present invention relate to the technical field of vehicle detection, and disclose an automatic construction method and apparatus for an automobile bus topology map. The method includes: acquiring automobile bus data and electronic control unit data; performing bus layout according to the automobile bus data and the electronic control unit data, and constructing an automobile bus topology map framework; and performing layout on an electronic control unit according to the automobile bus topology map framework to generate an automobile bus topology map. By means of the method, personalized bus layout can be supported, a complex bus relationship can be supported, more vehicle model coverage can be supported while the accuracy of the topology map is maintained, and the development difficulty of diagnostic tools can be reduced.

19 Claims, 7 Drawing Sheets

(56) References Cited

U.S. PATENT DOCUMENTS

2019/0052543 A1     2/2019   Bansal
2020/0005563 A1*   1/2020   Zaccherini ............. G07C 5/008

FOREIGN PATENT DOCUMENTS

| CN | 107291068 A | 10/2017 |
| CN | 109934957 A | 6/2019 |
| CN | 112800711 A | 5/2021 |
| EP | 1316478 A2 | 6/2003 |
| WO | 2020020932 A1 | 1/2020 |

OTHER PUBLICATIONS

The extended European search report of EP patent application No. 21917254.1 issued on May 24, 2024.

* cited by examiner a) Root_Single　　　　b) Root_Wide　　　　c) Root_Normal a) Node_Single  b) Node_Share c) Node_Normal  d) Node_Wide

AUTOMATIC CONSTRUCTION METHOD AND APPARATUS FOR AUTOMOBILE BUS TOPOLOGY MAP, AND COMPUTING DEVICE

CROSS REFERENCE

The present application is the National Stage application for PCT patent application Serial No. PCT/CN2021/137481, filed on Dec. 13, 2021, which claims priority to Chinese Patent Application No. 202110013942.3, entitled "AUTOMATIC CONSTRUCTION METHOD AND APPARATUS FOR AUTOMOBILE BUS TOPOLOGY MAP, AND COMPUTING DEVICE", filed on Wednesday, Jan. 6, 2021, by China Patent Office, which is incorporated herein by reference in its entirety.

BACKGROUND

Technical Field

The present application relates to the technical field of vehicle detection, in particular to an automatic construction method and apparatus for an automobile bus topology map.

Related Art

In the automobile computer failure analysis, more than 50% of the failures are caused by communication reasons. Communication failure causes include power bus failure, power failure, communication line failure, unit failure, or sensor failure. Automobile bus topology map is popular with maintenance technicians in playing a very important role in automobile maintenance because of its intuitive, global and dynamic display of the communication state among automobile electronic components. Constructing precise and accurate topology map on diagnostic tools usually relies on manual mapping, and then the manual mapping is transformed into computer algorithm mapping, which is difficult and high technical requirements.

SUMMARY

In view of the foregoing, embodiments of the present invention provide an automatic construction method and apparatus for an automobile bus topology map that overcomes or at least partially solves the foregoing problems.

According to an aspect according to an embodiment of the present invention, provided is an automatic construction method and apparatus for an automobile bus topology map, which comprises: acquiring automobile bus data and electronic control unit data, performing bus layout according to the automobile bus data and the electronic control unit data, and constructing an automobile bus topology map framework; and performing layout on an electronic control unit according to the automobile bus topology map framework to generate an automobile bus topology map.

In an alternative, the acquiring automobile bus data and electronic control unit data comprises: acquiring bus information about an automobile and configuration information about an electronic control unit; and numbering a bus and an electronic control unit according to the bus information and the configuration information, combing a connection relationship between the electronic control unit and the bus, finding out a diagnosis interface node and a root node, and obtaining the automobile bus data and the electronic control unit data.

In an alternative, the performing bus layout according to the automobile bus data and the electronic control unit data, and constructing an automobile bus topology map framework comprises: extracting a critical bus according to the vehicle bus data and the electronic control unit data; performing pre-layout of bus according to the critical bus and a first ring bus connected to a root node, and constructing an initial automobile bus topology map framework; and adjusting the initial automobile bus topology map framework according to a first non-critical bus to obtain a complete automobile bus topology map framework, wherein at least one electronic control unit in a set composed of electronic control units connected to the first non-critical bus is not connected to any other bus which has been performed layout.

In an alternative, the extracting a critical bus from the vehicle bus data and the electronic control unit data comprises: performing bus classification according to the automobile bus data, the bus comprising: a first bus connected from the root node to a common electronic control unit, a second bus connected from the diagnostic interface node to the common electronic control unit, a ring bus, a third bus connected from the diagnostic interface node to the root node, and a fourth bus not connected to the diagnostic interface node or the root node; and filtering away a backup bus and an internal bus from the first bus and the second bus to obtain the critical bus.

In an alternative, the filtering away a backup bus and an internal bus from the first bus and the second bus to obtain the critical bus comprises: comparing a set $S_k$ corresponding to the $k^{th}$ bus with a set $S_i$ corresponding to any other bus, wherein the set $S_k$ is a set composed of all the electronic control units connected to the $k^{th}$ bus; taking the $k^{th}$ bus as a critical bus if the set $S_k$ is not contained by any set $S_i$ and is not equal; selecting one of all equal buses as a critical bus if the set $S_k$ is not contained by any other set $S_i$ but is equal; and traversing the first bus and the second bus to obtain all the critical buses.

In an alternative, the performing pre-layout of bus according to the critical bus and a first ring bus connected to a root node, and constructing an initial automobile bus topology map framework comprises; determining a number of columns to be occupied by all buses from the critical bus and the first ring bus; performing neighbor set segmentation on each of the critical buses, and combining the critical buses with a bridging relationship into a neighbor set; performing layout on all the neighbor sets according to weights; and performing layout on the critical buses in the neighbor set to obtain an initial automobile bus topology map framework according to the number of neighbors and the importance of buses.

In an alternative, the determining a number of columns to be occupied by all buses from the critical bus and the first ring bus comprises: estimating the number of columns needed to be occupied by each of the critical buses according to the number of electronic control units to which each of the critical buses is connected; evaluating the number of columns needed to be occupied by the first ring bus as a function of the number of electronic control units on the first ring bus and the number of electronic control units that bridge other buses; calculating the total number of columns needed to be occupied by all critical buses and the first ring bus, and adjusting the topology map of the first ring bus according to the total number of columns.

In an alternative, the performing layout on all the neighbor sets according to weights comprises: performing layout on the first ring bus in a central area if the first ring bus is present, otherwise performing layout on the neighbor set with the highest weight in the central area; circularly performing layout on the remaining neighbor sets in an order of performing layout on the left side of the central area first and then performing layout on the right side of the central area until all the neighbor sets are performed layout, wherein the occupied area is marked as an occupied state each time the neighbor sets are performed layout.

In an alternative, the performing layout on the critical buses in the neighbor set to obtain an initial automobile bus topology map framework according to the number of neighbors and the importance of buses comprises: prioritizing the critical buses in the neighbor set in a descending order of neighbor number, if neighbor number is the same, sorting the critical buses in the neighbor set according to the importance; performing layout on a first one of the critical buses taken out from the neighbor set in the middle according to a bus sorting within the neighbor set, and performing layout on the other critical buses in the neighbor set in turn according to the relative position of the neighbor set and a central area in a preset order.

In an alternative, the adjusting the initial automobile bus topology map framework according to a first non-critical bus comprises: selecting a space-saving topology structural layout structure to perform layout on a second ring bus which is not connected to a root node; searching for a free area at the beginning of the first non-critical bus to perform layout on the electronic control unit connected to the first non-critical bus and not connected to any other bus already performed layout; inserting a column for performing layout on the electronic control unit connected to the first non-critical bus and not connected to any of the other buses that have been performed layout, and updating the corresponding bus layout location in the initial automobile bus topology map framework if there is not enough free area.

In an alternative, the performing layout on the electronic control units according to the automobile bus topology map framework comprises: prioritizing electronic control units on buses having a large number of neighbors; performing layout on the electronic control units on each critical bus in a descending order of the number of electronic control units connected to the bus.

In an alternative, the performing layout on the electronic control units according to the automobile bus topology map framework further comprises: performing layout on a non-critical bus where a layout-free but connected electronic control units have been performed layout.

In an alternative, the method further comprises: retrieving a reference model in a priori case base according to the automobile bus data and the electronic control unit data; if the reference model is retrieved, the layout is performed according to data provided by the reference model, wherein the data provided by the reference model includes, but is not limited to, the number of columns occupied, the layout order of the bus, and the layout location of the electronic control units.

According to another aspect according to an embodiment of the present invention, provided is an automatic construction apparatus for an automobile bus topology map comprising: a data acquisition unit configured to acquire vehicle bus data and electronic control unit data; a bus layout unit configured to perform bus layout according to the automobile bus data and the electronic control unit data to construct an automobile bus topology map framework; a topology map generation unit configured to perform layout on an electronic control unit according to the automobile bus topology map framework to generate an automobile bus topology map. According to another aspect according to an embodiment of the present invention, provided is a vehicle inspection device including: a processor, a memory, a communication interface, and a communication bus, wherein the processor, the memory, and the communication interface communicate with each other via the communication bus;

the memory is configured to store at least one executable instruction that causes the processor to perform the steps of the automatic construction method for an automobile bus topology map as described above.

According to yet another aspect according to an embodiment of the present invention, provided is a computer storage medium having stored therein at least one executable instruction for causing the processor to perform the steps of the automatic construction method for an automobile bus topology map described above.

The embodiment of the present invention acquires automobile bus data and electronic control unit data; performing bus layout according to the automobile bus data and the electronic control unit data, and constructing an automobile bus topology map framework and performing layout on an electronic control unit according to the automobile bus topology map framework to generate an automobile bus topology map can support a personalized bus layout and support a complex bus relationship, and support more vehicle type coverage while maintaining the accuracy of the topology map to reduce the difficulty of developing a diagnostic tool.

While the foregoing is directed to embodiments of the present invention, other and further embodiments of the invention may be devised without departing from the basic scope thereof, and the scope thereof is determined by the claims that follow.

BRIEF DESCRIPTION OF THE DRAWINGS

Various other advantages and benefits will become apparent to a person skilled in the art upon reading the following detailed description of the preferred embodiments. The drawings are only for purposes of illustrating the preferred embodiments and are not to be construed as limiting the invention. Moreover, like reference numerals designate like parts throughout the several views. In the drawings.

DETAILED DESCRIPTION

Hereinafter, exemplary embodiments of the present invention will be described in more detail with reference to the accompanying drawings. While the drawings show exemplary embodiments of the invention, the invention may be embodied in various forms and should not be construed as limited to the embodiments set forth herein. Rather, these embodiments are provided so that the disclosure will be thorough and complete, and will fully convey the scope of the invention to a person skilled in the art.

Figure 1:
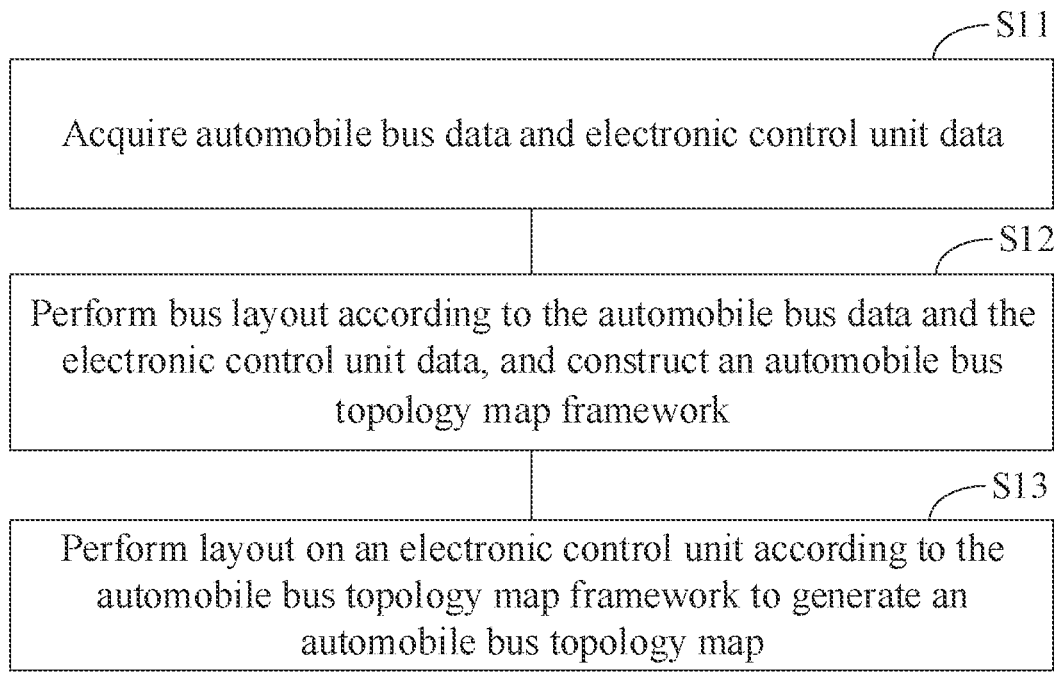
FIG. 1 is a schematic flow chart illustrating an automatic construction method for an automobile bus topology map according to an embodiment of the present invention.

FIG. 1 is a schematic flow chart illustrating an automatic construction method for an automobile bus topology map according to an embodiment of the present invention. The method is performed by an electronic device. The electronic device may be a mobile phone, a tablet, a notebook computer, an automotive diagnostic device, etc. The electronic device can be implemented on various platforms, including Windows, Linux, Android, iOS, etc., can be directly or indirectly communicatively connected with the automobile for acquiring relevant data and information about the automobile, and then a bus topology map of the automobile can be generated. The electronic device may self-display the bus topology map or send same to other display terminals.

As shown in FIG. 1, an automatic construction method for an automobile bus topology map comprises:

Step S11: acquiring automobile bus data and electronic control unit data

According to an embodiment of the present invention, bus information of an automobile and configuration information of an Electronic Control Unit (ECU) are acquired. The bus information includes bus characteristics and bus usage, and the priority of the bus is determined according to the bus characteristics and bus usage. The bus characteristics include bus type, transmission rate and topology map structure, and the bus types include high-speed CAN bus, low-speed CAN bus, K-Line bus, FLEXRAY bus and MOST. Bus usage includes powertrain, chassis, safety, diagnostics, central control, vehicle body, comfort, entertainment, information, private internal bus, etc. with priority from high to low. The ECU configuration information includes all possible ECU configurations, necessary ECU configurations, alternative ECU configurations, connection relationships between the ECU and the bus, etc.

Figure 2:
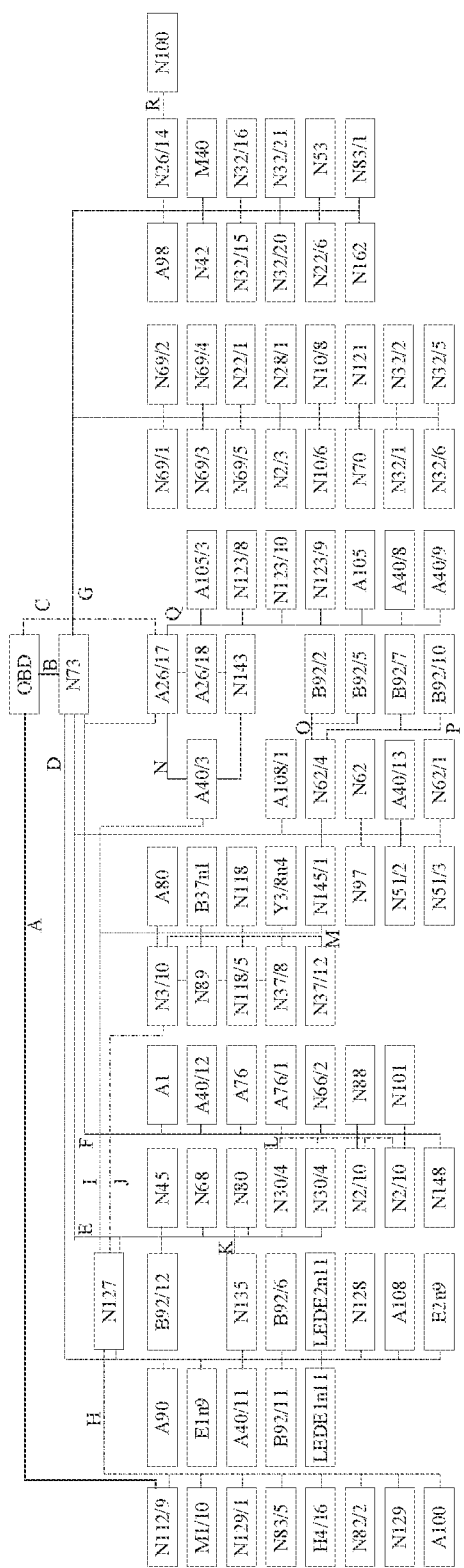
FIG. 2 is an example diagram illustrating an automobile bus topology map according to an embodiment of the present invention.
Figure 3:
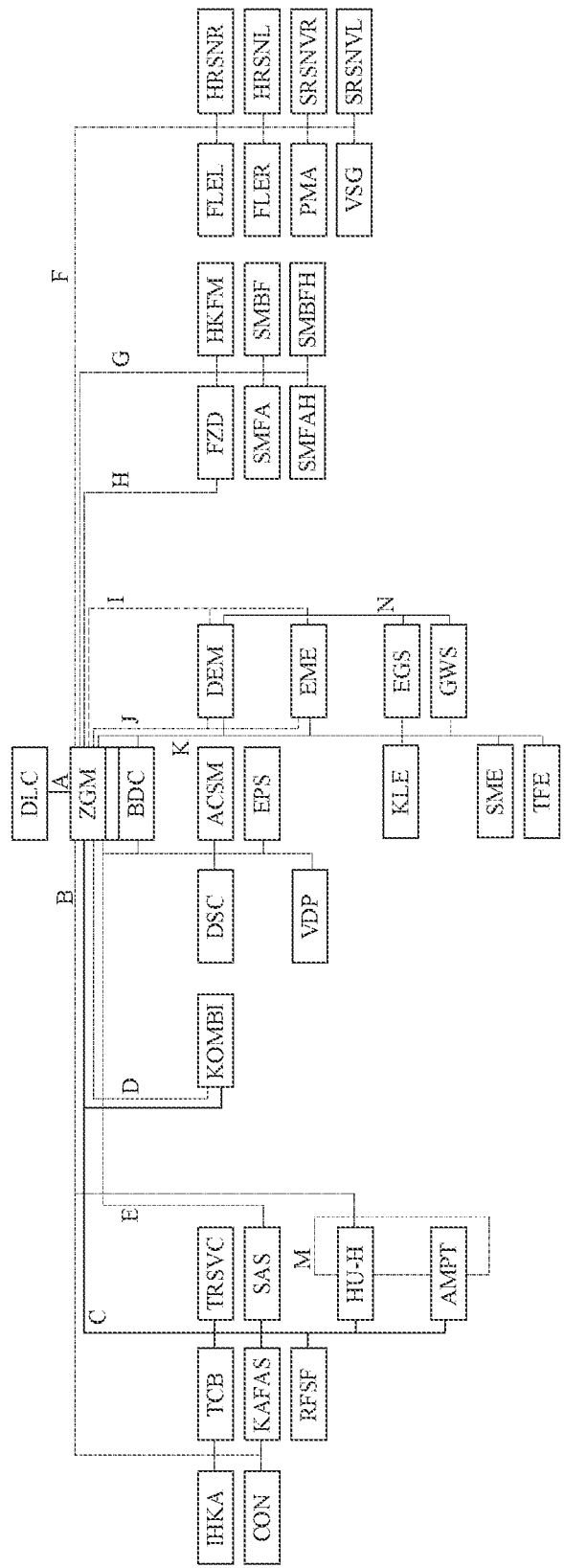
FIG. 3 is an example diagram illustrating yet another automobile bus topology map according to an embodiment of the present invention.

Then a bus and an electronic control unit are numbered according to the bus information and the configuration information, as shown in FIG. 2, and the connection relationship between the electronic control unit and the bus is combed, and a Diagnostic Link Connector (DLC) and a Root are found out, and the automobile bus data and the electronic control unit data are obtained. For example, for an automobile having an automobile bus topology map as shown in FIG. 3, the resulting computer algorithm can identify and process automobile bus data and electronic control unit data, see Tables 1 and 2, respectively, where DLC is the diagnostic interface node and ZGM is the root node.

TABLE 1

Automobile bus data

| Serial number | No. | Bus type | Name | Bus usage | Color | Weight | Description |
|---|---|---|---|---|---|---|---|
| 1 | A | BUS_DLC | A-BUS | Diagnosis | C_D_BUS | 25 | |
| 2 | B | BUS_Line | B-BUS | Integrated | C_K_CAN4 | 25 | |
| 3 | C | BUS_Line | C-BUS | Advanced driving assistance | C_Ethernet | 25 | |
| 4 | D | BUS_Line | D-BUS | Information | C_PT_CAN | 50 | |
| ...... | ...... | ...... | ...... | ...... | ...... | ...... | ...... |

TABLE 2

Electronic control unit data

| Serial number | No. | Name | Group | Lin | Root node | Connection bus | Full name |
|---|---|---|---|---|---|---|---|
| 1 | 11513 | OBD | NO | NO | NO | A | OnBoard Diagnose |
| 2 | 0 | ZGM | 0 | NO | Yes | ABCDEFGHIJK | |
| 3 | 1 | BDC | 0 | NO | NO | EK | |
| ...... | ...... | ...... | ...... | ...... | ...... | ...... | ...... |

As a starting point of the diagnostic bus, a diagnostic interface node is performed layout at the uppermost end of an automobile bus topology map, and occupies a single row. The DLC network is unique and is the entrance to electronic devices, such as diagnostic tools. The root node, as a default gateway, is the starting point of most buses, and is arranged as a single line and displayed in the middle, which can clearly show the logical structure of the network. Some automobiles also need to arrange secondary root nodes to better show the organizational structure among buses. The root node is typically connected directly to the DLC as a diagnostic tool to access a general entrance to the automobile.

Automobile bus data includes the name of each bus, bus type, bus usage, weight, etc. The electronic control unit data includes name, number, whether it is a root node, and all buses connected to the current electronic control unit, etc. Subsequent processing may be based on the vehicle bus data and the electronic control unit data to generate a vehicle bus topology map.

Step S12: performing bus layout according to the automobile bus data and the electronic control unit data, and constructing an automobile bus topology map framework.

Figure 4:
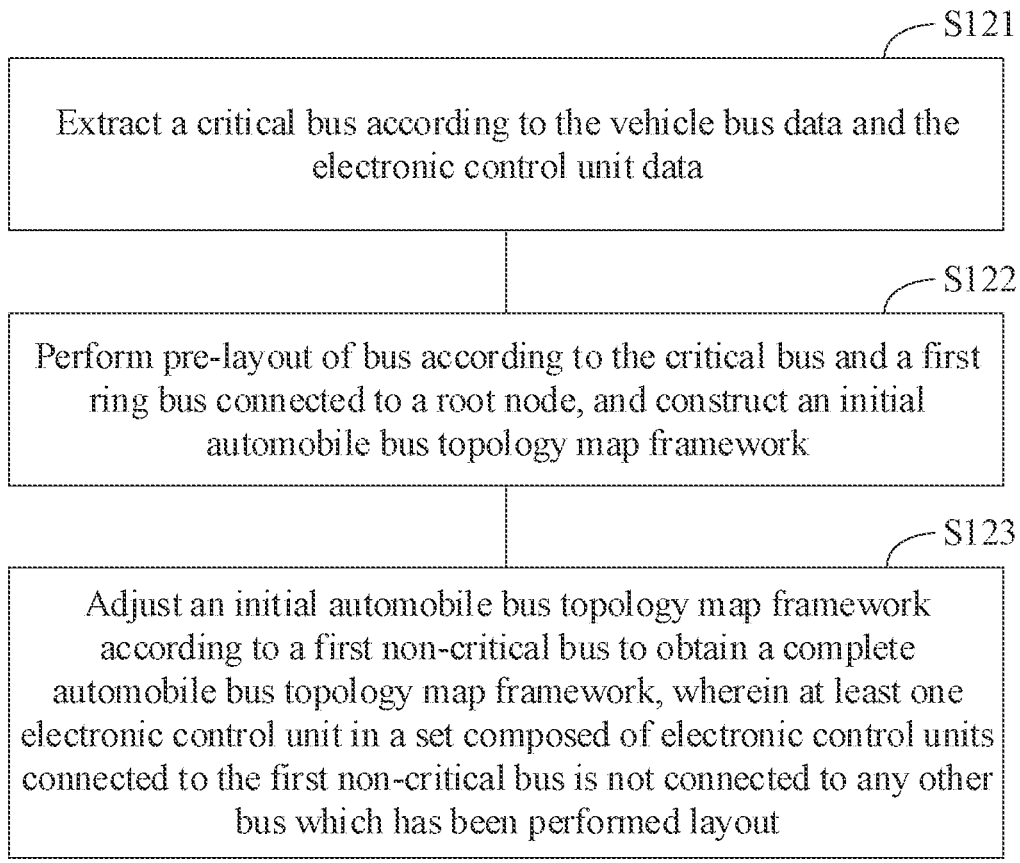
FIG. 4 is a schematic flow chart illustrating step S12 of the method in FIG. 1.

According to an embodiment of the present invention, as shown in FIG. 4, step S12 comprises:

Step S121: extracting a critical bus according to the vehicle bus data and the electronic control unit data.

The general internal bus and the backup bus will not affect the overall layout of the topology map, such as the internal bus K, M, L, etc. in FIG. 2, and the backup bus J, I, H, etc. in FIG. 3. In the overall layout analysis of the topology map, such bus is filtered out, and other reserved buses are used as the critical buses. The critical bus must be a bus connected to a common electronic control unit from a diagnostic interface node or a root node, which constitutes the basic skeleton of a topological graph, so it must be found in a Class0 or Class1 type bus, and in these two types of buses, the spare bus and the internal bus are eliminated, i.e., the critical bus.

According to an embodiment of the invention, the bus classification is based on the automobile bus data. In particular, the electronic control units are scanned one by one, the characteristics of the bus connections of the electronic control units are checked, and the buses are divided into five categories, the buses comprising: a first bus (Class0) connected from the root node to a common electronic control unit, a second bus (Class1) connected from the diagnosis interface node to the common electronic control unit, a ring bus (Class2), a third bus (Class3) connected from the diagnosis interface node to the root node, and a fourth bus (Class4) not connected to the diagnosis interface node or the root node. Wherein both the first bus and the fourth bus are non-ring buses. Table 3 gives the bus classification results corresponding to the bus topology map of the automobile in FIG. 3, including the type, purpose of each bus and the set of electronic control units connected to the bus.

TABLE 3

| Bus classification results | | | |
|---|---|---|---|
| Bus | Electronic control unit set | Type | Use |
| A | DLC, (ZGM/BDC) | Class3 | Diagnosis |
| B | ZGM, IHKA, TCB, CON, HU-H | Class0 | Comfort |
| C | ZGM, TCB, TRSVC, KASAS, SAS, RFSF, HU-H, KOMBI | Class0 | Information |
| D | ZGM, KOMBI | Class0 | Instrument |

TABLE 3-continued

| Bus classification results | | | |
|---|---|---|---|
| Bus | Electronic control unit set | Type | Use |
| E | ZGM, BDC, SAS, DSC, ACSM, EPS, VDP | Class0 | Chassis |
| F | ZGM, FLEL, HRSNR, FLER, HRSNL, PMA, SRSNVR, VSG, SRSNVL | Class0 | Vehicle body |
| G | ZGM, FZD, HKFM, SMFA, SMBF, SMF AH, SMBFH | Class0 | Vehicle body |
| H | ZGM, FZD | Class0 | Vehicle body |
| I | ZGM, DME, EME | Class0 | Power |
| J | ZGM, DME, EME | Class0 | Power |
| K | ZGM, DME, EME, KLE, EGS, GWS, SME, TFE | Class0 | Power |
| M | HU-H, AMPT | Class2 | Information |
| N | DME, EGS, GWS | Class4 | Power |

After classifying the buses, a backup bus and an internal bus are filtered away from the first bus and the second bus to obtain the critical bus. A set $S_k$ corresponding to the $k^{th}$ bus is compared with a set $S_i$ corresponding to any other bus using a set relationship analysis method, wherein the set $S_k$ is a set composed of all the electronic control units connected to the $k^{th}$ bus; if the set $S_k$ is not contained by any set $S_i$ and is not equal, the $k^{th}$ bus is a critical bus; selecting one of all equal buses as a critical bus if the set $S_k$ is not contained by any other set $S_i$ but is equal, generally selecting a bus with a relatively large weight as a critical bus; and traversing the first bus and the second bus to obtain all the critical buses.

Step S122: performing pre-layout of bus according to the critical bus and a first ring bus connected to a root node, and constructing an initial automobile bus topology map framework.

Pre-layout of bus mainly solves the allocation scheme of bus position in the first stage, and initially determines the number of columns occupied by each bus, the placement order of bus, and the suitable position arrangement of bus.

Figure 5:
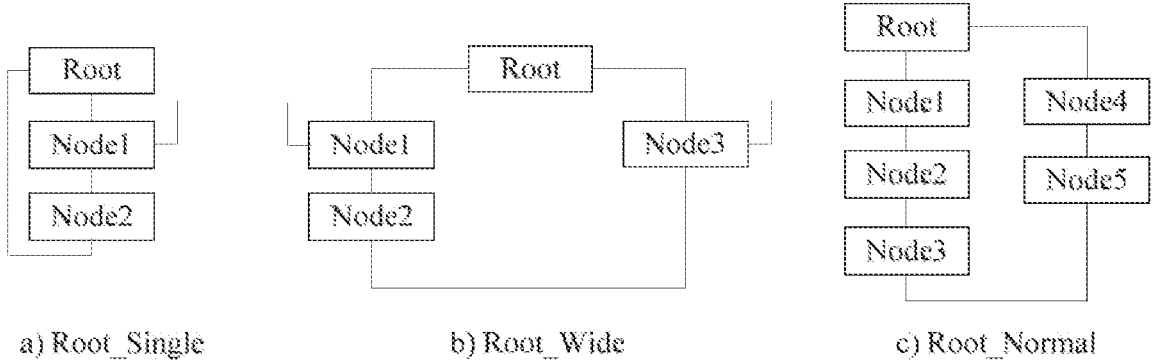
FIG. 5 is a schematic diagram illustrating a ring structure on a root node of an automatic construction method for an automobile bus topology map according to an embodiment of the present invention.
Figure 6:
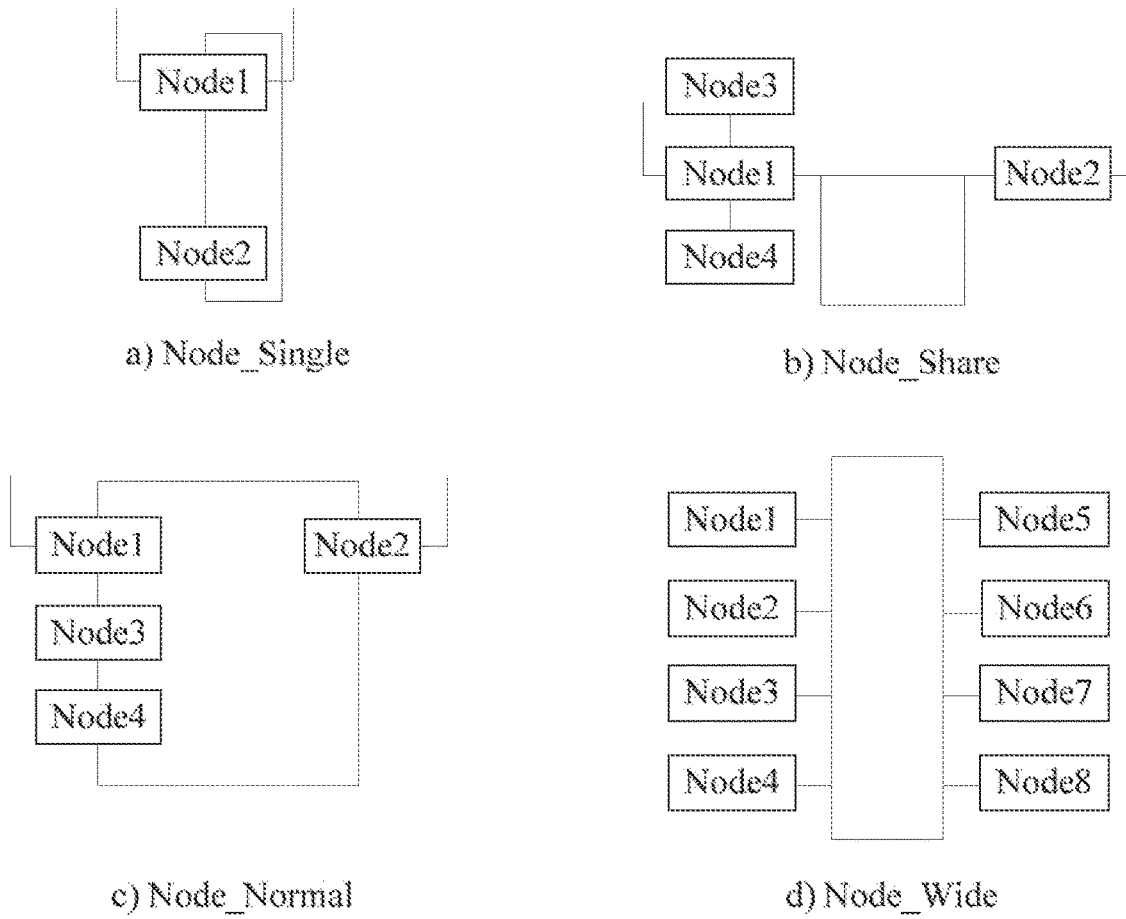
FIG. 6 is a schematic diagram illustrating a ring structure on a non-root node of an automatic construction method for an automobile bus topology map according to an embodiment of the present invention.

According to an embodiment of the invention, the number of columns needed to be occupied by all buses is first determined from the critical bus and the first ring bus. In particular, estimating the number of columns needed to be occupied by each of the critical buses according to the number of electronic control units to which each of the critical buses is connected; evaluating the number of columns needed to be occupied by the first ring bus as a function of the number of electronic control units on the first ring bus and the number of electronic control units that bridge other buses; calculating the total number of columns needed to be occupied by all critical buses and the first ring bus, and adjusting the topology map of the first ring bus according to the total number of columns. The number of each vertical line does not exceed 12 rows for the connection of the electronic control unit of the non-diagnostic interface node and the root node. If there are no more than 3 electronic control units on the loop and only one node is connected to other buses, it is recommended to occupy 1 column; if more than one node is bridged with other buses, one method may be chosen from FIG. 5 or FIG. 6. If the total number of columns is too large, more than 15 columns, it is necessary to optimize the number of columns occupied by a ring bus, and select a topology map in which the number of columns occupied by a ring bus is relatively small.

The critical bus and the first ring bus are then arranged, and the arrangement sequence comprises three steps: set partitioning, inter-set assignment, intra-set assignment. The number of buses bridged to each other is calculated by each critical bus via an electronic control unit; neighbor set division is performed on each of the critical buses; and the critical buses with a bridging relationship are combined into a neighbor set. Table 4 is a bus neighbor relationship analysis corresponding to the bus topology map of the automobile in FIG. 3, and Table 5 is a neighbor set segmentation result obtained according to the bus neighbor relationship analysis in Table 4.

TABLE 4

Analysis of bus neighbor relationship

| Bus | Set | Neighbor content | Number of neighbors | Instructions |
|---|---|---|---|---|
| B | S1 | B, C | 2 | |
| C | S2 | B, C, E | 3 | BCE is taken as a set of bridged neighbors |
| E | S3 | C, E | 2 | |
| F | S4 | F | 1 | |
| G | S5 | G | 1 | |
| K | S6 | K | 1 | |

TABLE 5

Neighbor set segmentation results

| Set | Containing bus | Weight | Instructions |
|---|---|---|---|
| SS1 | BCE | 75 | |
| SS2 | F | 25 | |
| SS3 | G | 25 | |
| SS4 | K | 100 | |

After all the neighbor sets are obtained according to the bus neighbor relationship analysis, all the neighbor sets are performed layout according to a weight, and the neighbor sets are performed layout according to the weight, and each neighbor set is performed layout according to the order of firstly middle, then left, right, left, and right . . . . The specific layout flow is as follows: performing layout on the first ring bus in a central area if the first ring bus is present, otherwise performing layout on the neighbor set with the highest weight in the central area; circularly performing layout on the remaining neighbor sets in an order of performing layout on the left side of the central area first and then performing layout on the right side of the central area until all the neighbor sets are performed layout, wherein the occupied area is marked as an occupied state each time the neighbor sets are performed layout. That is, after the central area is performed layout, taking the nearest neighbor set with the highest weight among all the remaining nearest neighbor sets, searching from the central area to the left whether there is enough column space to perform layout on the nearest neighbor set, and if so, the nearest neighbor set being performed layout on from the central area to the left, and marking the column space of the layout as an occupied state; otherwise it is searched from the central area to the right whether there is enough column space to arrange the neighbor set, and if so, the neighbor set is arranged from the central area to the right and the already arranged column space is marked as occupied. Then taking the next nearest neighbor set with the highest weight, searching from the central area to the right whether there is enough column space to distribute the nearest neighbor set, and if so, distributing the nearest neighbor set from the central area to the right, and marking the occupied column space as an occupied state, otherwise it is searched from the central area to the left whether there is enough column space to arrange the neighbor set, and if so, the neighbor set is arranged to the left of the central area. All remaining neighbor sets are circularly performed layout according to the previous layout method until all neighbor sets are performed layout.

After completing the layout of all neighbor sets, the buses in the neighbor sets are further performed layout. The critical buses in the neighbor set are performed layout to obtain an initial automobile bus topology map framework according to the number of neighbors and the importance of buses.

In particular, the critical buses in the neighbor set are prioritized to be arranged in a descending order of the number of neighbors, and if the number of neighbors is the same, the critical buses in the neighbor set are ordered according to the importance. For example, for the layout of a neighbor set SS1 comprising a bus BCE, see Table 4, the number of neighbors of bus C is at most 3, so bus C is preferably performed layout, while the number of neighbors of bus B and bus E is the same, both being 2, but the importance of the chassis bus E is higher than that of the comfort bus B, so bus E is sorted before bus B, thus obtaining that the bus in the neighbor set SS1 is ordered as CEB.

After the sorting is completed, performing layout on a first one of the critical buses taken out from the neighbor set in the middle according to a bus sorting within the neighbor set, and performing layout on the other critical buses in the neighbor set in turn according to the relative position of the neighbor set and a central area in a preset order. Specifically, if the neighbor set is performed layout to the left of the central area, the other critical buses in the neighbor set are performed layout in an order of right→left→right→left . . . ; if the neighbor set is performed layout to the right of the central area, the other critical buses in the neighbor set are performed layout in an order of left→right→left→right. For example, referring to FIG. 3, for a bus layout within the neighbor set SS1 with a bus sorting as CEB, bus C is performed layout in the middle, since the neighbor set SS1 is performed layout to the left of the central area, bus B and bus E are performed layout in an order of right→left, i.e. bus E immediately following row bus C is performed layout to the right of bus C and bus B is performed layout to the left of bus C. After completing the layout of the critical bus and the first ring bus, an initial automobile bus topology map framework is obtained, so that it can be ensured that the important bus or the bus with a complex link relationship is arranged near the center of the layout.

Step S123: adjusting the initial automobile bus topology map framework according to a first non-critical bus to obtain a complete automobile bus topology map framework, wherein at least one electronic control unit in a set composed of electronic control units connected to the first non-critical bus is not connected to any other bus which has been performed layout.

In the pre-layout stage, the initial automobile bus topology map framework based on the critical bus and the first ring bus does not consider the influence of the connection ring bus and the internal bus on the layout on the non-root node, so it needs to adjust and add the influence of these two buses under the initial automobile bus topology map framework. Specifically, the process is as follows:

a space-saving topology structural layout is selected for the second ring bus that is not connected to the root node. Considering primarily whether the ring structure of the second ring bus may allow more space to other buses or share some space with other buses. For example, the scheme of Root_Wide can be replaced with the scheme of Root_Normal in FIG. 5, and the scheme of Root_Normal can be used as far as possible; it is possible to replace the scheme of Node_Normal with the scheme of Node_Share in FIG. 6, and try to use the scheme of Node_Share.

For a first non-critical bus to which connected electronic control units are not connected on other buses, it is necessary to assign locations to these electronic control units and to arrange layouts for such buses. A free area is searched for at the beginning of the first non-critical bus to perform layout on the electronic control unit connected to the first non-critical bus and not connected to any other bus already performed layout; inserting a column for performing layout on the electronic control unit connected to the first non-critical bus and not connected to any of the other buses that have been performed layout, and the corresponding bus layout location is updated in the initial automobile bus topology map framework if there is not enough free area. The process of inserting columns will destroy the arrangement position of the initial automobile bus topology map framework, so that the order of bus arrangement needs to be updated synchronously. The automobile bus topology map framework is completed through this layout.

Step S13: performing layout on an electronic control unit according to the automobile bus topology map framework to generate an automobile bus topology map.

According to an embodiment of the present invention, after the bus layout calculations are completed, the appropriate locations for the cells on each bus need to be arranged. The electronic control unit on the bus with a large number of neighbors is prioritized for layout, and the bus with a small number of neighbors is finally arranged; the electronic control units on each critical bus are performed layout in a descending order of the number of electronic control units connected to the bus. The nodes are arranged according to the sorting result, and the arrangement rule is as follows: checking whether the current electronic control unit has been performed layout on other buses, for example, in FIG. 3, when performing layout on the connection unit on bus B, the TCB has been performed layout on bus C, then no layout is needed; in the vertical direction, layout from top to bottom starting from the next row of the root node; in the horizontal direction, it is necessary to simultaneously connect a plurality of buses, such as the TCB node in FIG. 3, and to simultaneously connect bus B and bus C, so that the TCB node is arranged between bus B and bus C.

After all the electronic control unit layouts have been completed, the position of part of the non-critical bus has been performed layout in the layout following the connected cell phase change. The non-critical bus on which the layout-free but connected electronic control units have been performed layout is then performed layout, and the part of the non-critical bus may be a backup bus or an internal bus. For a backup bus, such as two JI backup buses which are not performed layout at this time in FIG. 3, the correspondingly connected electronic control units DME and EME have been performed layout along with the critical bus K, mainly analyzing the bus allocation situation at the column gaps, and the bus distribution is evenly distributed among the column gaps as far as possible, with each gap having not more than 3 buses at most. For the internal bus, the situation is similar to that of the backup bus if the location of the connected unit is already performed layout on the other bus; if a cell connected on an internal bus is not connected to another bus, the bus is performed layout at the appropriate gap depending on where the cell is performed layout, the layout principle being similar to a backup bus.

The automatic construction of an automobile bus topology map is completed, the automatic construction method for an automobile bus topology map according to an embodiment of the present invention simplifies a topology map architecture analysis process by adopting a critical bus technology; through the division of bus neighbor set, the whole topology map layout is completed. By means of the descending cross arrangement rule of the adjacent buses in the nearest neighbor set, the processing method of the complex association relationship between buses is simplified, which can support the complex bus relationship and the personalized bus layout. Through pre-layout and adjustment of two-stage layout scheme, more accurate layout is achieved, the requirements for operators are relatively low, while maintaining the accuracy of topology map, supporting more vehicle type coverage, and reducing the difficulty of diagnostic tool development.

Figure 7:
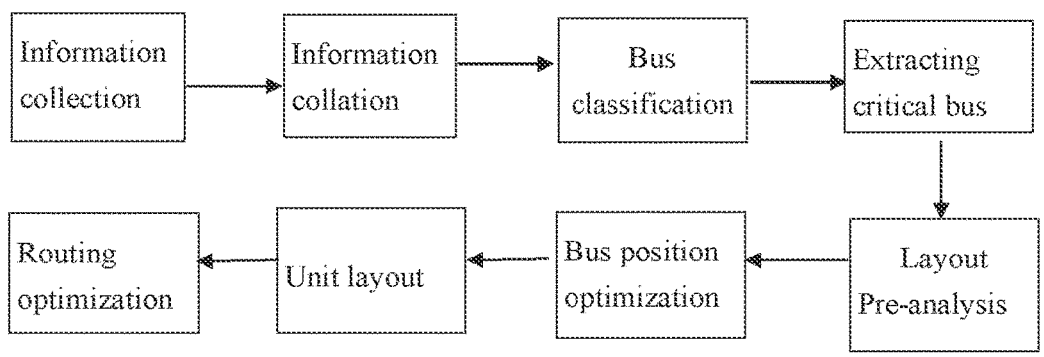
FIG. 7 is another schematic flow chart illustrating an automatic construction method and apparatus for an automobile bus topology map according to an embodiment of the present invention.

A complete automatic construction method for an automobile bus topology map according to an embodiment of the present invention is as shown in FIG. 7, firstly information is collected, specifically, bus information about an automobile and configuration information about an electronic control unit are acquired. Information is sorted according to the collected information, and specifically the bus and the electronic control unit are numbered according to the bus information and the configuration information about the electronic control unit, the connection relationship between the electronic control unit and the bus is combed, a diagnosis interface node and a root node are found out, and automobile bus data and electronic control unit data which can be identified and processed by a computer algorithm are obtained. The bus is classified by scanning the electronic control unit one by one according to the bus data of the automobile and the data of the electronic control unit, and checking the characteristics of the bus connection of the electronic control unit. The critical bus is extracted according to the classified bus, and the internal bus and the backup bus which do not affect the overall layout of the automobile bus topology map are filtered out. According to the layout pre-analysis of the extracted critical bus and the classified ring bus, the number of rows of the whole automobile bus topology map is not more than 15 rows, and the area of the common electronic control unit is not more than 12 rows. According to the number of electronic control units configured by each critical bus and the bus characteristics, the number of columns occupied by each bus is calculated, and the number of columns occupied by all buses is counted. With the method of dividing adjacent bus sets, the preliminary arrangement of the positions of the critical buses is made. In the neighbor sets, the positions of the buses are arranged by the descending cross arrangement method, and the initial automobile bus topology map framework is obtained. The bus position of the layout is further optimized, and a more suitable ring layout mode (selected from FIGS. 5 and 6) is selected according to the number of layout columns obtained by pre-analysis; at the same time, the influence of the internal bus connection on the layout is analyzed, and the positional relationship between buses is locally adjusted to obtain an automobile bus topology map framework. The electronic control unit is performed layout according to the automobile bus topology map framework, and the electronic control unit data is arranged at an appropriate position according to the calculated bus layout and the connection relationship between the electronic control unit and the bus; finally, the remaining spare bus and the unpopulated internal bus are optimized to get the complete bus topology map.

Figure 8:
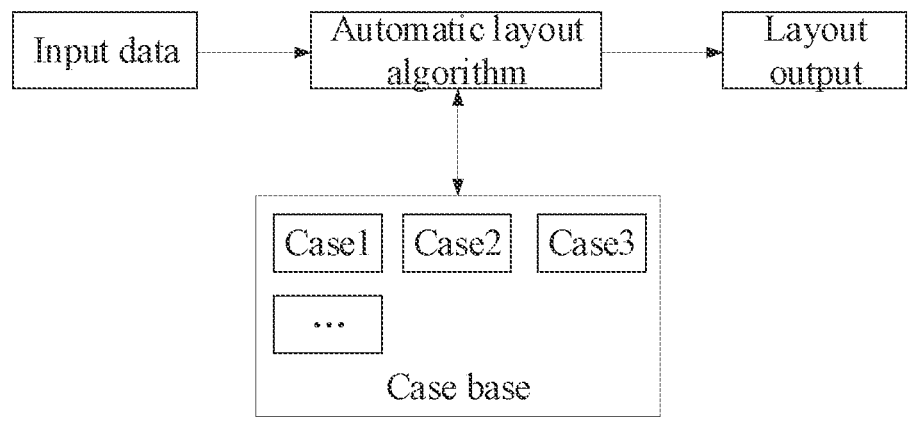
FIG. 8 is a schematic diagram illustrating an automatic construction method for an automobile bus topology map with a priori case base according to an embodiment of the present invention.

According to an embodiment of the present invention, a layout arranged using an automated algorithm is not necessarily optimal in appearance and rationality, but some a priori knowledge of the arrangement of the layout can be added to optimize the layout, such as the KOMBI node in FIG. 3, which is represented by drawing a list of two CD buses separately. Specifically, a reference model in a priori case base is retrieved according to the automobile bus data and the electronic control unit data; if the reference model is retrieved, the layout is performed according to data provided by the reference model, wherein the data provided by the reference model includes, but is not limited to, the number of columns occupied, the layout order of the bus, and the layout location of the electronic control units. FIG. 8 provides a schematic diagram of an automatic layout algorithm with a prior case base, wherein the case base comprises a plurality of reference models Case1, Case2, Case3 . . . , and the automatic layout algorithm identifies a connected electronic control unit or a bus type according to input data, and retrieves whether there is a corresponding reference model from the case base, and if there is a reference model, performing layout arrangement according to the data provided by the reference model, otherwise performing arrangement according to the automobile bus automatic construction method described above. The data provided by the reference model includes, but is not limited to, the number of columns occupied, the arrangement order of the bus in the layout, the location of the cell arrangement, etc.

According to an embodiment of the invention, the electronic device may be provided with a self-learning function, i.e. after completion of the automatic construction of the bus topology map of the automobile, the topology map structure data in which the layout is important may be saved as a reference model in the case base. Embodiments of the present invention enrich the structural characteristics of a topology map and support more personalized layout effects by adopting a case base method.

The embodiment of the present invention acquires automobile bus data and electronic control unit data; performing bus layout according to the automobile bus data and the electronic control unit data, and constructing an automobile bus topology map framework and performing layout on an electronic control unit according to the automobile bus topology map framework to generate an automobile bus topology map can support a personalized bus layout and support a complex bus relationship, and support more vehicle type coverage while maintaining the accuracy of the topology map to reduce the difficulty of developing a diagnostic tool.

Figure 9:
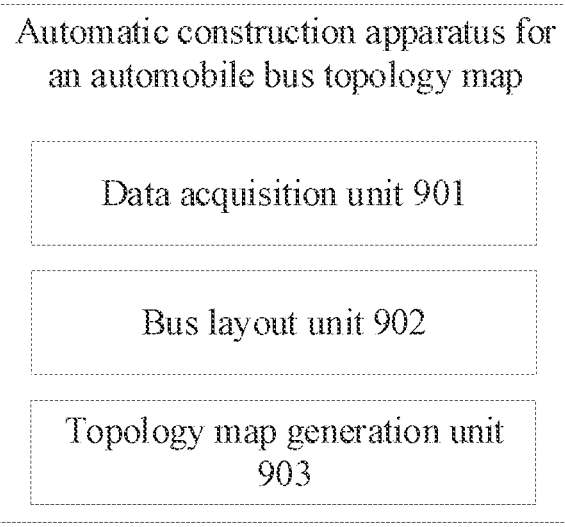
FIG. 9 is a structural schematic diagram illustrating an automatic construction apparatus for an automobile bus topology map according to an embodiment of the present invention.
Figure 10:
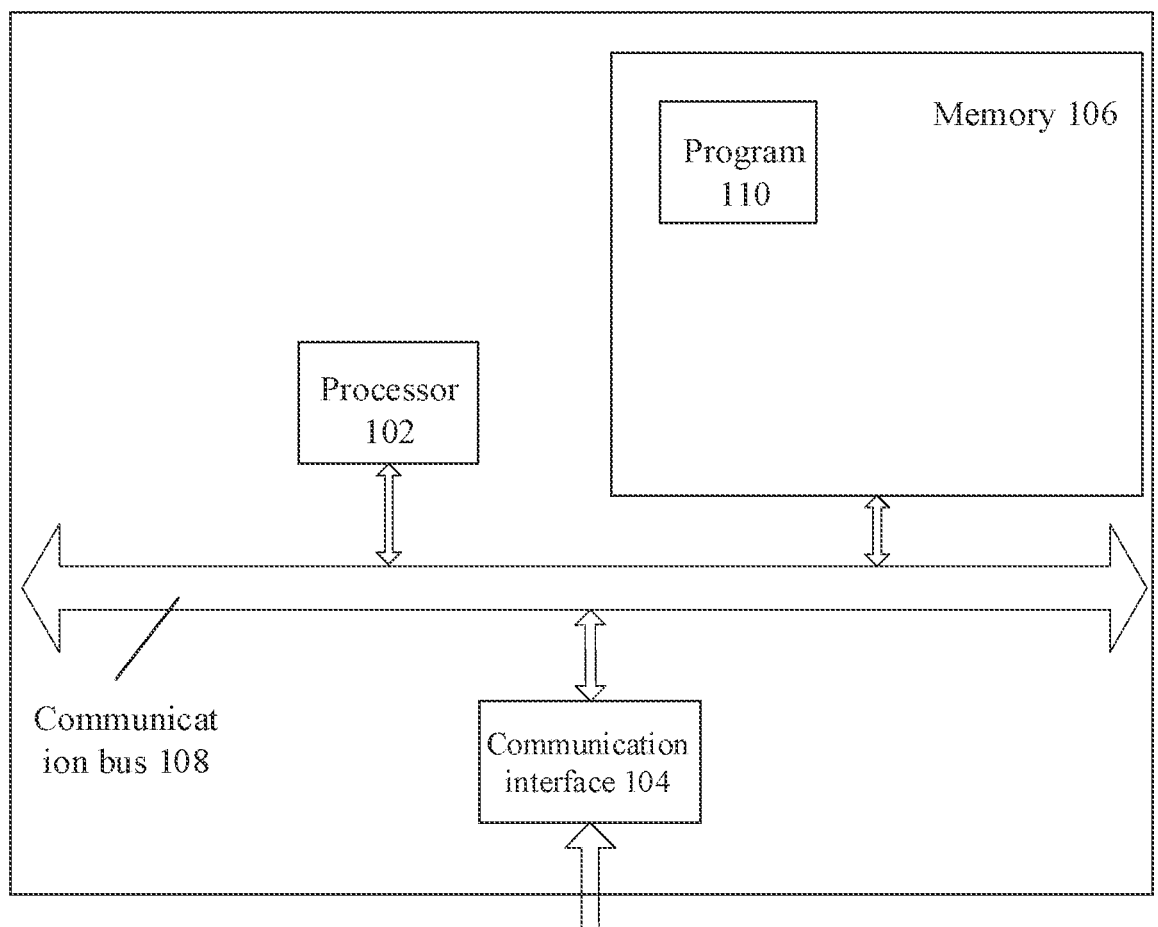
FIG. 10 is a structural schematic diagram illustrating a computing device according to an embodiment of the present invention

FIG. 9 is a structural schematic diagram illustrating an automatic construction apparatus for an automobile bus topology map according to an embodiment of the present invention. The automatic construction apparatus for an automobile bus topology map is applied to vehicle fault diagnosis equipment. As shown in FIG. 10, the automatic construction apparatus for an automobile bus topology map comprises: a data acquisition unit 901, a bus layout unit 902, and a topology map generation unit 903.

The data acquisition unit 901 is configured to acquire vehicle bus data and electronic control unit data; the bus layout unit 902 is configured to perform bus layout according to the automobile bus data and the electronic control unit data to construct an automobile bus topology map framework; and the topology map generation unit 903 is configured to perform layout on an electronic control unit according to the automobile bus topology map framework to generate an automobile bus topology map.

In an alternative, the data acquisition unit 901 is adapted for: acquiring bus information about an automobile and configuration information about an electronic control unit; and numbering a bus and an electronic control unit according to the bus information and the configuration information, combing a connection relationship between the electronic control unit and the bus, finding out a diagnosis interface node and a root node, and obtaining the automobile bus data and the electronic control unit data.

In an alternative, the bus layout unit 902 is adapted for: extracting a critical bus according to the vehicle bus data and the electronic control unit data; performing pre-layout of bus according to the critical bus and a first ring bus connected to a root node, and constructing an initial automobile bus topology map framework; and adjusting the initial automobile bus topology map framework according to a first non-critical bus to obtain a complete automobile bus topology map framework, wherein at least one electronic control unit in a set composed of electronic control units connected to the first non-critical bus is not connected to any other bus which has been performed layout.

In an alternative, the bus layout unit 902 is adapted for: performing bus classification according to the automobile bus data, the bus comprising: a first bus connected from the root node to a common electronic control unit, a second bus connected from the diagnostic interface node to the common electronic control unit, a ring bus, a third bus connected from the diagnostic interface node to the root node, and a fourth bus not connected to the diagnostic interface node or the root node; and filtering away a backup bus and an internal bus from the first bus and the second bus to obtain the critical bus.

In an alternative, the bus layout unit 902 is adapted for: comparing a set $S_k$ corresponding to the $k^{th}$ bus with a set $S_i$ corresponding to any other bus, wherein the set $S_k$ is a set composed of all the electronic control units connected to the $k^{th}$ bus; taking the $k^{th}$ bus as a critical bus if the set $S_k$ is not contained by any set $S_i$ and is not equal; selecting one of all equal buses as a critical bus if the set $S_k$ is not contained by any other set $S_i$ but is equal; and traversing the first bus and the second bus to obtain all the critical buses.

In an alternative, the bus layout unit 902 is adapted for: prioritizing the critical buses in the neighbor set in a descending order of neighbor number, if neighbor number is the same, sorting the critical buses in the neighbor set according to the importance; performing layout on a first one of the critical buses taken out from the neighbor set in the middle according to a bus sorting within the neighbor set, and performing layout on the other critical buses in the neighbor set in turn according to the relative position of the neighbor set and a central area in a preset order.

In an alternative, the bus layout unit 902 is adapted for: selecting a space-saving topology structural layout structure to perform layout on a second ring bus which is not connected to a root node; searching for a free area at the beginning of the first non-critical bus to perform layout on the electronic control unit connected to the first non-critical bus and not connected to any other bus already performed layout; inserting a column for performing layout on the electronic control unit connected to the first non-critical bus and not connected to any of the other buses that have been performed layout, and updating the corresponding bus layout location in the initial automobile bus topology map framework if there is not enough free area.

In an alternative, the topology map generation unit 903 is adapted for: prioritizing electronic control units on buses having a large number of neighbors; performing layout on the electronic control units on each critical bus in a descending order of the number of electronic control units connected to the bus.

In an alternative, the topology map generation unit 903 is further adapted for: performing layout on a non-critical bus where a layout-free but connected electronic control units have been performed layout.

In an alternative, the topology map generation unit 903 is further adapted for: retrieving a reference model in a priori case base according to the automobile bus data and the electronic control unit data; if the reference model is retrieved, the layout is performed according to data provided by the reference model, wherein the data provided by the reference model includes, but is not limited to, the number of columns occupied, the layout order of the bus, and the layout location of the electronic control units.

The embodiment of the present invention acquires automobile bus data and electronic control unit data; performing bus layout according to the automobile bus data and the electronic control unit data, and constructing an automobile bus topology map framework and performing layout on an electronic control unit according to the automobile bus topology map framework to generate an automobile bus topology map can support a personalized bus layout and support a complex bus relationship, and support more vehicle type coverage while maintaining the accuracy of the topology map to reduce the difficulty of developing a diagnostic tool.

Embodiments of the present invention provide a non-volatile computer storage medium having stored thereon at least one executable instruction for performing the automatic construction method for an automobile bus topology map in any of the method embodiments described above.

The executable instructions may be used, in particular, to cause a processor to perform the following operations:
  acquiring automobile bus data and electronic control unit data;
  performing bus layout according to the automobile bus data and the electronic control unit data, and constructing an automobile bus topology map framework; and
  performing layout on an electronic control unit according to the automobile bus topology map framework to generate an automobile bus topology map.

In an alternative, the executable instructions cause the processor to perform the operations of:
  acquiring bus information about an automobile and configuration information about an electronic control unit; and
  numbering a bus and an electronic control unit according to the bus information and the configuration information, combing a connection relationship between the electronic control unit and the bus, finding out a diagnosis interface node and a root node, and obtaining the automobile bus data and the electronic control unit data.

In an alternative, the executable instructions cause the processor to perform the operations of:
  extracting a critical bus according to the vehicle bus data and the electronic control unit data;
  performing pre-layout of bus according to the critical bus and a first ring bus connected to a root node, and constructing an initial automobile bus topology map framework; and
  adjusting the initial automobile bus topology map framework according to a first non-critical bus to obtain a complete automobile bus topology map framework, wherein at least one electronic control unit in a set composed of electronic control units connected to the first non-critical bus is not connected to any other bus which has been performed layout.

In an alternative, the executable instructions cause the processor to perform the operations of:
  performing bus classification according to the automobile bus data, the bus comprising: a first bus connected from the root node to a common electronic control unit, a second bus connected from the diagnosis interface node to the common electronic control unit, a ring bus, a third bus connected from the diagnosis interface node to the root node, and a fourth bus not connected to the diagnosis interface node or the root node; and
  filtering away a backup bus and an internal bus from the first bus and the second bus to obtain the critical bus.

In an alternative, the executable instructions cause the processor to perform the operations of:
  comparing a set $S_k$ corresponding to the $k^{th}$ bus with a set $S_i$ corresponding to any other bus, wherein the set $S_k$ is a set composed of all the electronic control units connected to the $k^{th}$ bus;
  taking the $k^{th}$ bus as a critical bus if the set $S_k$ is not contained by any set $S_i$ and is not equal;
  selecting one of all equal buses as a critical bus if the set $S_k$ is not contained by any other set $S_i$ but is equal; and
  traversing the first bus and the second bus to obtain all the critical buses.

In an alternative, the executable instructions cause the processor to perform the operations of:
  determining a number of columns to be occupied by all buses from the critical bus and the first ring bus;
  performing neighbor set segmentation on each of the critical buses, and combining the critical buses with a bridging relationship into a neighbor set;
  performing layout on all the neighbor sets according to weights; and
  performing layout on the critical buses in the neighbor set to obtain an initial automobile bus topology map framework according to the number of neighbors and the importance of buses.

In an alternative, the executable instructions cause the processor to perform the operations of:
  estimating the number of columns needed to be occupied by each of the critical buses according to the number of electronic control units to which each of the critical buses is connected;
  evaluating the number of columns needed to be occupied by the first ring bus as a function of the number of electronic control units on the first ring bus and the number of electronic control units that bridge other buses; and
  calculating the total number of columns needed to be occupied by all critical buses and the first ring bus, and adjusting the topology map of the first ring bus according to the total number of columns.

In an alternative, the executable instructions cause the processor to perform the operations of:
  performing layout on the first ring bus in a central area if there is the first ring bus, otherwise performing layout on the neighbor set with the highest weight in the central area, and
  circularly performing layout on the remaining neighbor sets in an order of performing layout on the left side of the central area first and then performing layout on the right side of the central area until all the neighbor sets are performed layout, wherein the occupied area is marked as an occupied state each time the neighbor sets are performed layout.

In an alternative, the executable instructions cause the processor to perform the operations of:
  prioritizing to arrange the critical buses in the neighbor set in a descending order of the number of neighbors, and sorting the critical buses in the neighbor set according to the importance if the number of neighbors is the same; and
  performing layout on a first one of the critical buses taken out from the neighbor set in the middle according to a bus sorting within the neighbor set, and performing layout on the other critical buses in the neighbor set in turn according to the relative position of the neighbor set and a central area in a preset order.

In an alternative, the executable instructions cause the processor to perform the operations of:
  selecting a space-saving topology structural layout for the second ring bus that is not connected to the root node;
  searching for a free area at the beginning of the first non-critical bus to perform layout on the electronic control unit connected to the first non-critical bus and not connected to any other bus already performed layout; and
  inserting a column for performing layout on the electronic control unit connected to the first non-critical bus and not connected to any of the other buses that have been performed layout, and updating the corresponding bus layout location in the initial automobile bus topology map framework if there is not enough free area.

In an alternative, the executable instructions cause the processor to perform the operations of:
  prioritizing layout of the electronic control units on the bus having a large number of neighbors; and;
  performing layout on the electronic control units on each critical bus in a descending order of the number of electronic control units connected to the bus.

In an alternative, the executable instructions cause the processor to perform the operations of:
  performing layout on a non-critical bus on which layout-free but connected electronic control units have been performed layout.

In an alternative, the executable instructions cause the processor to perform the operations of:
  retrieving a reference model in a priori case base according to the automobile bus data and the electronic control unit data; and
  performing layout according to data provided by the reference model if the reference model is retrieved, wherein the data provided by the reference model comprises, but is not limited to, the number of columns occupied, the layout order of the bus, and the layout location of the electronic control units.

The embodiment of the present invention acquires automobile bus data and electronic control unit data; performing bus layout according to the automobile bus data and the electronic control unit data, and constructing an automobile bus topology map framework and performing layout on an electronic control unit according to the automobile bus topology map framework to generate an automobile bus topology map can support a personalized bus layout and support a complex bus relationship, and support more vehicle type coverage while maintaining the accuracy of the topology map to reduce the difficulty of developing a diagnostic tool.

An embodiment of the present invention provides an automatic construction apparatus for an automobile bus topology map for executing the above-mentioned automatic construction method and apparatus for an automobile bus topology map.

Embodiments of the present invention provide a computer program that can be invoked by a processor to cause a base station apparatus to perform the automatic construction method for an automobile bus topology map in any of the above-described method embodiments.

Embodiments of the present invention provide a computer program product comprising a computer program stored on a computer storage medium, the computer program comprising program instructions which, when executed by a computer, cause the computer to carry out the automatic construction method for an automobile bus topology map in any of the method embodiments described above.

The executable instructions may be used, in particular, to cause a processor to perform the following operations:
  acquiring automobile bus data and electronic control unit data;
  performing bus layout according to the automobile bus data and the electronic control unit data, and constructing an automobile bus topology map framework; and
  Performing layout on an electronic control unit according to the automobile bus topology map framework to generate an automobile bus topology map.

In an alternative, the executable instructions cause the processor to perform the operations of:
  acquiring bus information about an automobile and configuration information about an electronic control unit; and
  numbering a bus and an electronic control unit according to the bus information and the configuration information, combing a connection relationship between the electronic control unit and the bus, finding out a diagnosis interface node and a root node, and obtaining the automobile bus data and the electronic control unit data.

In an alternative, the executable instructions cause the processor to perform the operations of:
  extracting a critical bus according to the vehicle bus data and the electronic control unit data;
  performing pre-layout of bus according to the critical bus and a first ring bus connected to a root node, and constructing an initial automobile bus topology map framework; and
  adjusting the initial automobile bus topology map framework according to a first non-critical bus to obtain a complete automobile bus topology map framework, wherein at least one electronic control unit in a set composed of electronic control units connected to the first non-critical bus is not connected to any other bus which has been performed layout.

In an alternative, the executable instructions cause the processor to perform the operations of:
  performing bus classification according to the automobile bus data, the bus comprising: a first bus connected from the root node to a common electronic control unit, a second bus connected from the diagnosis interface node to the common electronic control unit, a ring bus, a third bus connected from the diagnosis interface node to the root node, and a fourth bus not connected to the diagnosis interface node or the root node; and filtering away a backup bus and an internal bus from the first bus and the second bus to obtain the critical bus.

In an alternative, the executable instructions cause the processor to perform the operations of:
comparing a set $S_k$ corresponding to the $k^{th}$ bus with a set $S_i$ corresponding to any other bus, wherein the set $S_k$ is a set composed of all the electronic control units connected to the $k^{th}$ bus;
taking the $k^{th}$ bus as a critical bus if the set $S_k$ is not contained by any set $S_i$ and is not equal;
selecting one of all equal buses as a critical bus if the set $S_k$ is not contained by any other set $S_i$ but is equal; and
traversing the first bus and the second bus to obtain all the critical buses.

In an alternative, the executable instructions cause the processor to perform the operations of:
determining a number of columns to be occupied by all buses from the critical bus and the first ring bus;
performing neighbor set segmentation on each of the critical buses, and combining the critical buses with a bridging relationship into a neighbor set,
performing layout on all the neighbor sets according to weights; and
performing layout on the critical buses in the neighbor set to obtain an initial automobile bus topology map framework according to the number of neighbors and the importance of buses.

In an alternative, the executable instructions cause the processor to perform the operations of:
estimating the number of columns needed to be occupied by each of the critical buses according to the number of electronic control units to which each of the critical buses is connected;
evaluating the number of columns needed to be occupied by the first ring bus as a function of the number of electronic control units on the first ring bus and the number of electronic control units that bridge other buses; and
calculating the total number of columns needed to be occupied by all critical buses and the first ring bus, and adjusting the topology map of the first ring bus according to the total number of columns.

In an alternative, the executable instructions cause the processor to perform the operations of:
performing layout on the first ring bus in a central area if there is the first ring bus, otherwise performing layout on the neighbor set with the highest weight in the central area; and
circularly performing layout on the remaining neighbor sets in an order of performing layout on the left side of the central area first and then performing layout on the right side of the central area until all the neighbor sets are performed layout, wherein the occupied area is marked as an occupied state each time the neighbor sets are performed layout.

In an alternative, the executable instructions cause the processor to perform the operations of:
prioritizing to arrange the critical buses in the neighbor set in a descending order of the number of neighbors, and sorting the critical buses in the neighbor set according to the importance if the number of neighbors is the same; and
performing layout on a first one of the critical buses taken out from the neighbor set in the middle according to a bus sorting within the neighbor set, and performing layout on the other critical buses in the neighbor set in turn according to the relative position of the neighbor set and a central area in a preset order.

In an alternative, the executable instructions cause the processor to perform the operations of:
selecting a space-saving topology structural layout for the second ring bus that is not connected to the root node;
searching for a free area at the beginning of the first non-critical bus to perform layout on the electronic control unit connected to the first non-critical bus and not connected to any other bus already performed layout; and
inserting a column for performing layout on the electronic control unit connected to the first non-critical bus and not connected to any of the other buses that have been performed layout, and updating the corresponding bus layout location in the initial automobile bus topology map framework if there is not enough free area.

In an alternative, the executable instructions cause the processor to perform the operations of:
prioritizing layout of the electronic control units on the bus having a large number of neighbors; and;
performing layout on the electronic control units on each critical bus in a descending order of the number of electronic control units connected to the bus.

In an alternative, the executable instructions cause the processor to perform the operations of:
performing layout on a non-critical bus on which layout-free but connected electronic control units have been performed layout.

In an alternative, the executable instructions cause the processor to perform the operations of:
retrieving a reference model in a priori case base according to the automobile bus data and the electronic control unit data; and
performing layout according to data provided by the reference model if the reference model is retrieved, wherein the data provided by the reference model comprises, but is not limited to, the number of columns occupied, the layout order of the bus, and the layout location of the electronic control units.

The embodiment of the present invention acquires automobile bus data and electronic control unit data; performing bus layout according to the automobile bus data and the electronic control unit data, and constructing an automobile bus topology map framework and performing layout on an electronic control unit according to the automobile bus topology map framework to generate an automobile bus topology map can support a personalized bus layout and support a complex bus relationship, and support more vehicle type coverage while maintaining the accuracy of the topology map to reduce the difficulty of developing a diagnostic tool.

FIG. 10 shows a schematic diagram of a computing device according to an embodiment of the present invention, and the specific embodiment of the present invention does not limit the specific implementation of the device.

As shown in FIG. 10, the computing device may include: a processor 102, a Communications Interface 104, a memory 106, and a communication bus 108.

The processor 102, the communication interface 104, and the memory 106 communicate with each other over a communication bus 108. A communication interface 104 for communicating with network elements of other devices such as a network element of a client or other servers, etc. The processor 102 for executing the program 110 can specifically perform the relevant steps in the above-mentioned embodiment of the automatic construction method for an automobile bus topology map.

In particular, program 110 may include program code comprising computer operating instructions.

The processor 102 may be a central processing unit CPU, or an Application Specific Integrated Circuit (ASIC), or one or more integrated circuits configured to implement embodiments of the present invention. The device comprises one or more processors, which may be of the same type, such as one or more CPUs; it may also be a different type of processor, such as one or more CPUs and one or more ASICs.

The memory 106 is used for storing a program 110. The memory 106 may include high-speed RAM memory, and may also include non-volatile memory, such as at least one disk memory.

The program 110 may be used, in particular, to cause the processor 102 to perform the following operations;
acquiring automobile bus data and electronic control unit data;
performing bus layout according to the automobile bus data and the electronic control unit data, and constructing an automobile bus topology map framework; and
Performing layout on an electronic control unit according to the automobile bus topology map framework to generate an automobile bus topology map.

In an alternative, the program 110 causes the processor to perform the following operations:
acquiring bus information about an automobile and configuration information about an electronic control unit; and
numbering a bus and an electronic control unit according to the bus information and the configuration information, combing a connection relationship between the electronic control unit and the bus, finding out a diagnosis interface node and a root node, and obtaining the automobile bus data and the electronic control unit data.

In an alternative, the program 110 causes the processor to perform the following operations;
extracting a critical bus according to the vehicle bus data and the electronic control unit data;
performing pre-layout of bus according to the critical bus and a first ring bus connected to a root node, and constructing an initial automobile bus topology map framework; and
adjusting the initial automobile bus topology map framework according to a first non-critical bus to obtain a complete automobile bus topology map framework, wherein at least one electronic control unit in a set composed of electronic control units connected to the first non-critical bus is not connected to any other bus which has been performed layout.

In an alternative, the program 110 causes the processor to perform the following operations:
performing bus classification according to the automobile bus data, the bus comprising: a first bus connected from the root node to a common electronic control unit, a second bus connected from the diagnosis interface node to the common electronic control unit, a ring bus, a third bus connected from the diagnosis interface node to the root node, and a fourth bus not connected to the diagnosis interface node or the root node; and
filtering away a backup bus and an internal bus from the first bus and the second bus to obtain the critical bus.

In an alternative, the program 110 causes the processor to perform the following operations:
comparing a set $S_k$ corresponding to the $k^{th}$ bus with a set $S_i$ corresponding to any other bus, wherein the set $S_k$ is a set composed of all the electronic control units connected to the $k^{th}$ bus;
taking the $k^{th}$ bus as a critical bus if the set $S_k$ is not contained by any set $S_i$ and is not equal;
selecting one of all equal buses as a critical bus if the set $S_k$ is not contained by any other set $S_i$ but is equal; and
traversing the first bus and the second bus to obtain all the critical buses.

In an alternative, the program 110 causes the processor to perform the following operations:
determining a number of columns to be occupied by all buses from the critical bus and the first ring bus;
performing neighbor set segmentation on each of the critical buses, and combining the critical buses with a bridging relationship into a neighbor set;
performing layout on all the neighbor sets according to weights; and
performing layout on the critical buses in the neighbor set to obtain an initial automobile bus topology map framework according to the number of neighbors and the importance of buses.

In an alternative, the program 110 causes the processor to perform the following operations:
estimating the number of columns needed to be occupied by each of the critical buses according to the number of electronic control units to which each of the critical buses is connected;
evaluating the number of columns needed to be occupied by the first ring bus as a function of the number of electronic control units on the first ring bus and the number of electronic control units that bridge other buses; and
calculating the total number of columns needed to be occupied by all critical buses and the first ring bus, and adjusting the topology map of the first ring bus according to the total number of columns.

In an alternative, the program 110 causes the processor to perform the following operations:
performing layout on the first ring bus in a central area if there is the first ring bus, otherwise performing layout on the neighbor set with the highest weight in the central area, and
circularly performing layout on the remaining neighbor sets in an order of performing layout on the left side of the central area first and then performing layout on the right side of the central area until all the neighbor sets are performed layout, wherein the occupied area is marked as an occupied state each time the neighbor sets are performed layout.

In an alternative, the program 110 causes the processor to perform the following operations:
prioritizing to arrange the critical buses in the neighbor set in a descending order of the number of neighbors, and sorting the critical buses in the neighbor set according to the importance if the number of neighbors is the same; and
performing layout on a first one of the critical buses taken out from the neighbor set in the middle according to a bus sorting within the neighbor set, and performing layout on the other critical buses in the neighbor set in turn according to the relative position of the neighbor set and a central area in a preset order.

In an alternative, the program 110 causes the processor to perform the following operations:

selecting a space-saving topology structural layout for the second ring bus that is not connected to the root node;

searching for a free area at the beginning of the first non-critical bus to perform layout on the electronic control unit connected to the first non-critical bus and not connected to any other bus already performed layout; and inserting a column for performing layout on the electronic control unit connected to the first non-critical bus and not connected to any of the other buses that have been performed layout, and updating the corresponding bus layout location in the initial automobile bus topology map framework if there is not enough free area.

In an alternative, the program 110 causes the processor to perform the following operations:

prioritizing layout of the electronic control units on the bus having a large number of neighbors; and;

performing layout on the electronic control units on each critical bus in a descending order of the number of electronic control units connected to the bus.

In an alternative, the program 110 causes the processor to perform the following operations:

performing layout on a non-critical bus on which layout-free but connected electronic control units have been performed layout.

In an alternative, the program 110 causes the processor to perform the following operations:

retrieving a reference model in a priori case base according to the automobile bus data and the electronic control unit data; and performing layout according to data provided by the reference model if the reference model is retrieved, wherein the data provided by the reference model comprises, but is not limited to, the number of columns occupied, the layout order of the bus, and the layout location of the electronic control units.

The embodiment of the present invention acquires automobile bus data and electronic control unit data; performing bus layout according to the automobile bus data and the electronic control unit data, and constructing an automobile bus topology map framework and performing layout on an electronic control unit according to the automobile bus topology map framework to generate an automobile bus topology map can support a personalized bus layout and support a complex bus relationship, and support more vehicle type coverage while maintaining the accuracy of the topology map to reduce the difficulty of developing a diagnostic tool.

The algorithms or displays presented herein are not inherently related to any particular computer, virtual system, or other apparatus. Various general-purpose systems may also be used with the teachings based herein. The structure required to construct such a system is apparent from the above description. Further, embodiments of the present invention are not directed to any particular programming language. It will be appreciated that a variety of programming languages may be used to implement the teachings of the invention as described herein, and that the above description of specific languages is provided to disclose the best mode of performing out the invention.

In the description provided herein, numerous specific details are set forth. However, it is understood that embodiments of the present invention may be practiced without these specific details. In some instances, well-known methods, structures, and techniques have not been shown in detail in order not to obscure the understanding of this description.

Similarly, it should be appreciated that in the above description of example embodiments of the invention, various features of the embodiments of the invention are sometimes grouped together in a single embodiment, figure, or description thereof for the purpose of streamlining the invention and aiding in the understanding of one or more of the various inventive aspects. However, the disclosed methods are not to be interpreted as reflecting an intention that the claimed invention requires more features than are expressly recited in each claim.

It will be appreciated by a person skilled in the art that the modules in the devices in the embodiments may be adapted and arranged in one or more devices different from the embodiment. Modules or units or components According to an embodiment may be combined into one module or unit or component and may be divided into a plurality of sub-modules or sub-units or sub-components. All the features disclosed in this description (including any accompanying claims, abstract and drawings), and all the processes or elements of any method or apparatus so disclosed, may be combined in any combination, except combinations where at least some of such features and/or processes or elements are mutually exclusive. Each feature disclosed in this description (including any accompanying claims, abstract and drawings) may be replaced by alternative features serving the same, equivalent, or similar purpose, unless expressly stated otherwise.

The above-mentioned embodiments illustrate rather than limit the application, and that a person skilled in the art will be able to design alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The present disclosure can be implemented by means of hardware comprising several distinct elements, and by means of a suitably programmed computer. In the unit claims enumerating several means, several of these apparatuses can be embodied by one and the same item of hardware. The use of the words first, second, third, etc. does not denote any order. These words may be interpreted as names. The steps in the above embodiments are not to be construed as limiting the order of execution unless otherwise specified.

The invention claimed is:

1. An automatic construction method for an automobile bus topology map, comprising:

acquiring automobile bus data and electronic control unit data;

performing bus layout according to the automobile bus data and the electronic control unit data, and constructing an automobile bus topology map framework; and performing layout on an electronic control unit according to the automobile bus topology map framework to generate an automobile bus topology map;

wherein the acquiring automobile bus data and electronic control unit data comprises:

acquiring bus information about an automobile and configuration information about an electronic control unit; and numbering a bus and an electronic control unit according to the bus information and the configuration information, combing a connection relationship between the electronic control unit and the bus, finding out a diagnosis interface node and a root node, and obtaining the automobile bus data and the electronic control unit data.

2. The method according to claim 1, wherein the performing bus layout according to the automobile bus data and the electronic control unit data, and constructing an automobile bus topology map framework comprises:
  extracting a critical bus according to the vehicle bus data and the electronic control unit data;
  performing pre-layout of bus according to the critical bus and a first ring bus connected to a root node, and constructing an initial automobile bus topology map framework; and
  adjusting the initial automobile bus topology map framework according to a first non-critical bus to obtain a complete automobile bus topology map framework, wherein at least one electronic control unit in a set composed of electronic control units connected to the first non-critical bus is not connected to any other bus which has been performed layout.

3. The method according to claim 2, wherein the extracting a critical bus according to the vehicle bus data and the electronic control unit data comprises:
  performing bus classification according to the automobile bus data, the bus comprising: a first bus connected from the root node to a common electronic control unit, a second bus connected from the diagnosis interface node to the common electronic control unit, a ring bus, a third bus connected from the diagnosis interface node to the root node, and a fourth bus not connected to the diagnosis interface node or the root node; and
  filtering away a backup bus and an internal bus from the first bus and the second bus to obtain the critical bus.

4. The method according to claim 3, wherein the filtering away a backup bus and an internal bus from the first bus and the second bus to obtain the critical bus comprises:
  comparing a set $S_k$ corresponding to the $k^{th}$ bus with a set $S_i$ corresponding to any other bus, wherein the set $S_k$ is a set composed of all the electronic control units connected to the $k^{th}$ bus;
  taking the $k^{th}$ bus as a critical bus if the set $S_k$ is not contained by any set $S_i$ and is not equal;
  selecting one of all equal buses as a critical bus if the set $S_k$ is not contained by any other set $S_i$ but is equal; and
  traversing the first bus and the second bus to obtain all the critical buses.

5. The method according to claim 2, wherein the performing pre-layout of bus according to the critical bus and a first ring bus connected to a root node, and constructing an initial automobile bus topology map framework comprises:
  determining a number of columns to be occupied by all buses from the critical bus and the first ring bus;
  performing neighbor set segmentation on each of the critical buses, and combining the critical buses with a bridging relationship into a neighbor set;
  performing layout on all the neighbor sets according to weights; and
  performing layout on the critical buses in the neighbor set to obtain an initial automobile bus topology map framework according to the number of neighbors and the importance of buses.

6. The method according to claim 5, wherein the determining a number of columns to be occupied by all buses from the critical bus and the first ring bus comprises:
  estimating the number of columns needed to be occupied by each of the critical buses according to the number of electronic control units to which each of the critical buses is connected;
  evaluating the number of columns needed to be occupied by the first ring bus as a function of the number of electronic control units on the first ring bus and the number of electronic control units that bridge other buses; and
  calculating the total number of columns needed to be occupied by all critical buses and the first ring bus, and adjusting the topology map of the first ring bus according to the total number of columns.

7. The method according to claim 5, wherein the performing layout on all the neighbor sets according to weights comprises:
  performing layout on the first ring bus in a central area if there is the first ring bus, otherwise performing layout on the neighbor set with the highest weight in the central area; and
  circularly performing layout on the remaining neighbor sets in an order of performing layout on the left side of the central area first and then performing layout on the right side of the central area until all the neighbor sets are performed layout, wherein the occupied area is marked as an occupied state each time the neighbor sets are performed layout.

8. The method according to claim 7, wherein the performing layout on the critical buses in the neighbor set according to the number of neighbors and the importance of buses comprises:
  prioritizing to arrange the critical buses in the neighbor set in a descending order of the number of neighbors, and sorting the critical buses in the neighbor set according to the importance if the number of neighbors is the same; and
  performing layout on a first one of the critical buses taken out from the neighbor set in the middle according to a bus sorting within the neighbor set, and performing layout on the other critical buses in the neighbor set in turn according to the relative position of the neighbor set and a central area in a preset order.

9. The method according to claim 2, wherein the adjusting the initial automobile bus topology map framework according to the first non-critical bus comprises:
  selecting a space-saving topology structural layout for the second ring bus that is not connected to the root node;
  searching for a free area at the beginning of the first non-critical bus to perform layout on the electronic control unit connected to the first non-critical bus and not connected to any other bus already performed layout; and
  inserting a column for performing layout on the electronic control unit connected to the first non-critical bus and not connected to any of the other buses that have been performed layout, and updating the corresponding bus layout location in the initial automobile bus topology map framework if there is not enough free area.

10. The method according to claim 1, wherein the performing layout on an electronic control unit according to the automobile bus topology map framework comprises:
  prioritizing layout of the electronic control units on the bus having a large number of neighbors; and;
  performing layout on the electronic control units on each critical bus in a descending order of the number of electronic control units connected to the bus.

11. The method according to claim 1, wherein the performing layout on an electronic control unit according to the automobile bus topology map framework further comprises:
performing layout on a non-critical bus on which layout-free but connected electronic control units have been performed layout.

12. The method according to claim 1, further comprising:
retrieving a reference model in a priori case base according to the automobile bus data and the electronic control unit data; and
performing layout according to data provided by the reference model if the reference model is retrieved, wherein the data provided by the reference model comprises, but is not limited to, the number of columns occupied, the layout order of the bus, and the layout location of the electronic control units.

13. A computing device, comprising: a processor, a memory, a communication interface, and a communication bus, wherein the processor, the memory, and the communication interface communicate with each other through the communication bus;
wherein the memory is configured to store at least one executable instruction that causes the processor to perform the following method:
acquiring bus information about an automobile and configuration information about an electronic control unit; and
numbering a bus and an electronic control unit according to the bus information and the configuration information, combing a connection relationship between the electronic control unit and the bus, finding out a diagnosis interface node and a root node, and obtaining the automobile bus data and the electronic control unit data;
performing bus layout according to the automobile bus data and the electronic control unit data, and constructing an automobile bus topology map framework; and
performing layout on an electronic control unit according to the automobile bus topology map framework to generate an automobile bus topology map.

14. A non-transitory computer-readable storage medium, wherein the computer storage medium has stored therein at least one executable instruction for causing the processor to perform the steps of the automatic construction method for an automobile bus topology map according to claim 1.

15. The computing device according to claim 13, wherein the acquiring automobile bus data and electronic control unit data comprises:
acquiring bus information about an automobile and configuration information about an electronic control unit; and
numbering a bus and an electronic control unit according to the bus information and the configuration information, combing a connection relationship between the electronic control unit and the bus, finding out a diagnosis interface node and a root node, and obtaining the automobile bus data and the electronic control unit data.

16. The computing device according to claim 13, wherein the performing bus layout according to the automobile bus data and the electronic control unit data, and constructing an automobile bus topology map framework comprises:
extracting a critical bus according to the vehicle bus data and the electronic control unit data;
performing pre-layout of bus according to the critical bus and a first ring bus connected to a root node, and constructing an initial automobile bus topology map framework; and
adjusting the initial automobile bus topology map framework according to a first non-critical bus to obtain a complete automobile bus topology map framework, wherein at least one electronic control unit in a set composed of electronic control units connected to the first non-critical bus is not connected to any other bus which has been performed layout.

17. The computing device according to claim 16, wherein the extracting a critical bus according to the vehicle bus data and the electronic control unit data comprises:
performing bus classification according to the automobile bus data, the bus comprising: a first bus connected from the root node to a common electronic control unit, a second bus connected from the diagnosis interface node to the common electronic control unit, a ring bus, a third bus connected from the diagnosis interface node to the root node, and a fourth bus not connected to the diagnosis interface node or the root node; and
filtering away a backup bus and an internal bus from the first bus and the second bus to obtain the critical bus.

18. The computing device according to claim 17, wherein the filtering away a backup bus and an internal bus from the first bus and the second bus to obtain the critical bus comprises:
comparing a set $S_k$ corresponding to the $k^{th}$ bus with a set $S_i$ corresponding to any other bus, wherein the set $S_k$ is a set composed of all the electronic control units connected to the $k^{th}$ bus;
taking the $k^{th}$ bus as a critical bus if the set $S_k$ is not contained by any set $S_i$ and is not equal;
selecting one of all equal buses as a critical bus if the set $S_k$ is not contained by any other set $S_i$ but is equal; and
traversing the first bus and the second bus to obtain all the critical buses.

19. The computing device according to claim 16, wherein the performing pre-layout of bus according to the critical bus and a first ring bus connected to a root node, and constructing an initial automobile bus topology map framework comprises:
determining a number of columns to be occupied by all buses from the critical bus and the first ring bus;
performing neighbor set segmentation on each of the critical buses, and combining the critical buses with a bridging relationship into a neighbor set;
performing layout on all the neighbor sets according to weights; and
performing layout on the critical buses in the neighbor set to obtain an initial automobile bus topology map framework according to the number of neighbors and the importance of buses.

* * * * *